(12) United States Patent
Clari

(10) Patent No.: US 7,938,422 B2
(45) Date of Patent: May 10, 2011

(54) DEVICE FOR ADJUSTING INCLINATION OF A FRONT FORK OF A VEHICLE HAVING TWO OR THREE WHEELS, PARTICULARLY A CYCLE OR A MOTORCYCLE

(76) Inventor: Romano Clari, Nole Canavese (IT)

( * ) Notice: Subject to any disclaimer, the term of this patent is extended or adjusted under 35 U.S.C. 154(b) by 31 days.

(21) Appl. No.: 12/390,716

(22) Filed: Feb. 23, 2009

(65) Prior Publication Data
US 2009/0212525 A1    Aug. 27, 2009

(51) Int. Cl.
B62D 17/00 (2006.01)
B62K 21/04 (2006.01)
(52) U.S. Cl. .................... 280/280; 280/279
(58) Field of Classification Search .......... 280/276, 280/279, 278, 287, 270, 274, 281.1; 74/551.1, 74/551.3
See application file for complete search history.

(56) References Cited

U.S. PATENT DOCUMENTS

| | | | |
|---|---|---|---|
| 3,342,507 A * | 9/1967 | Koch et al. | 280/86.754 |
| 3,866,946 A | 2/1975 | Robison | |
| 4,565,384 A * | 1/1986 | Dehnisch | 280/279 |
| 4,600,207 A * | 7/1986 | Zosi | 280/279 |
| 4,700,963 A * | 10/1987 | Burns et al. | 280/276 |
| 6,783,158 B2 * | 8/2004 | Nakagawa et al. | 280/785 |

FOREIGN PATENT DOCUMENTS

| | | |
|---|---|---|
| DE | 196 07 434 A1 | 9/1996 |
| DE | 10 2006 024 326 | 11/2007 |

OTHER PUBLICATIONS

European Search Report dated Apr. 27, 2009 in connection with corresponding EP App No. 09153341.4.

* cited by examiner

*Primary Examiner* — Anne Marie M Boehler
(74) *Attorney, Agent, or Firm* — Nixon & Vanderhye P.C.

(57) ABSTRACT

A device is described, for adjusting the inclination of a front fork of a two- or three-wheeled vehicle having a steering assembly (S) including a frame tube (3) and a steering tube (4) rotatable in the frame tube. The adjusting device comprises an upper connecting unit (10a) and a lower connecting unit (10b), for rigidly connecting the steering tube (4) to two substantially parallel fork rods (5). The connecting units (10a, 10b) are prearranged for enabling to vary in an adjustable manner the inclination of the fork rods (5) relative to the steering tube (4), without the need of relative separation or disassembling among the units, the fork rods and the steering tube.

19 Claims, 6 Drawing Sheets

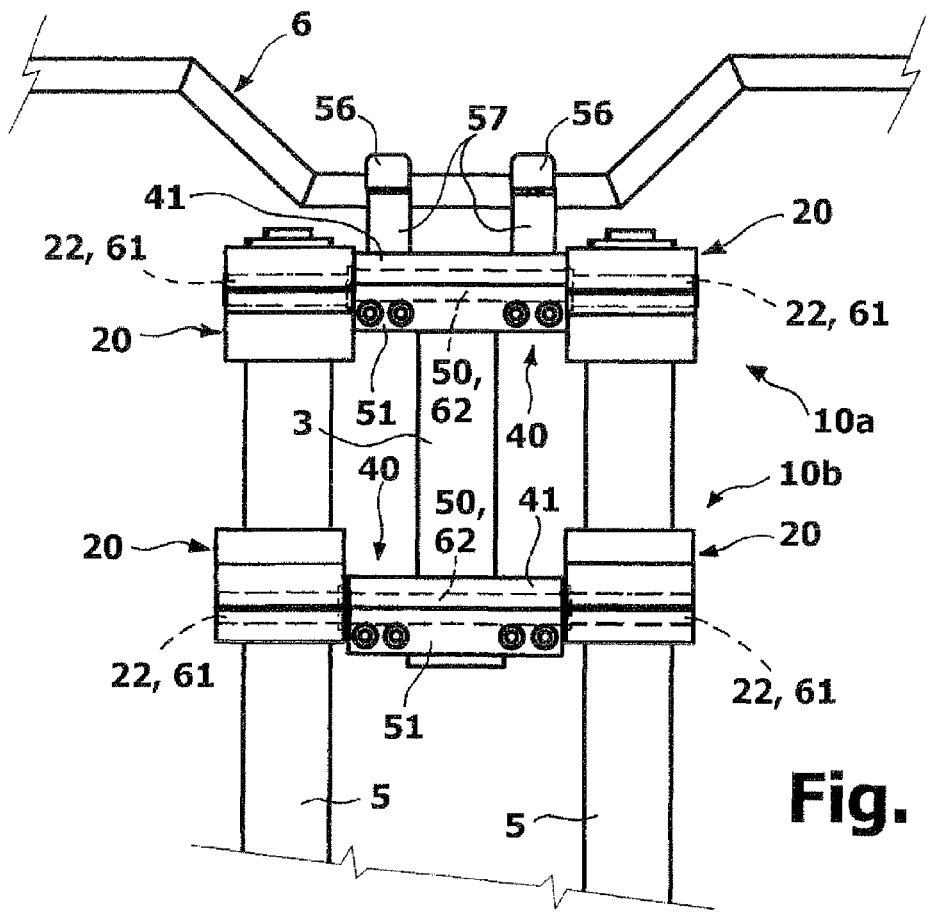
Fig. 3
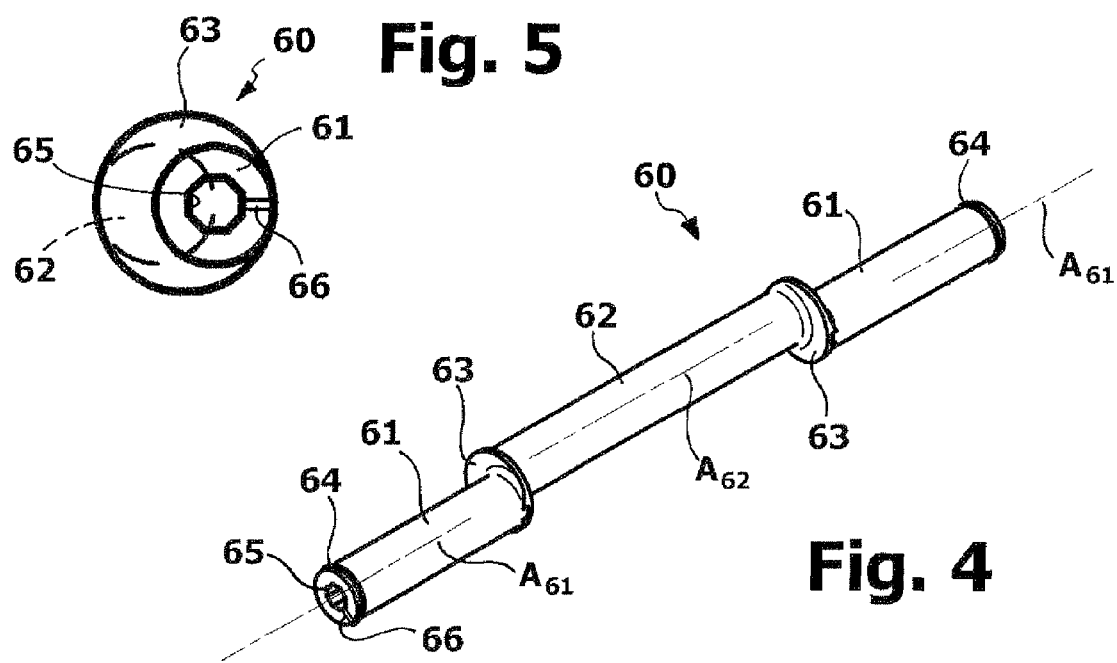
Fig. 5
Fig. 4

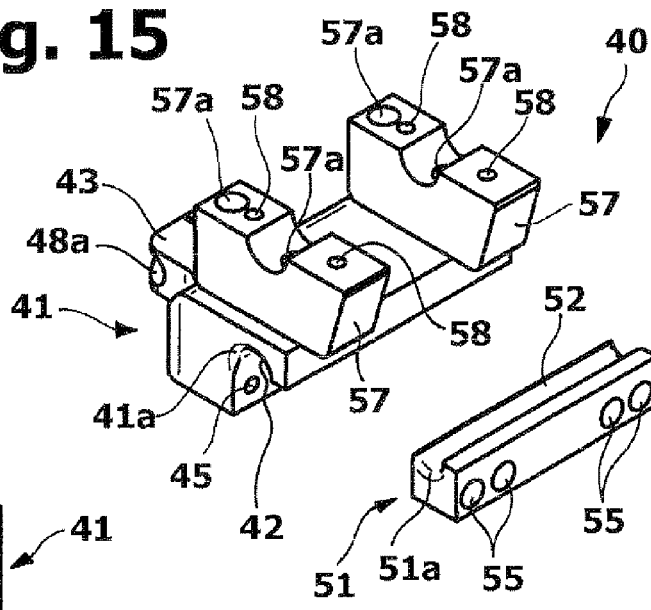
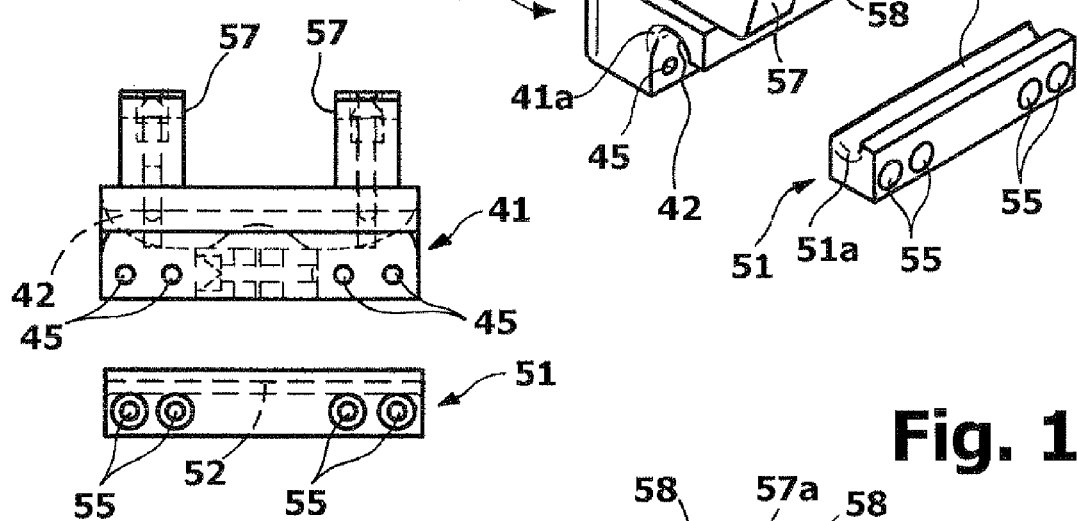
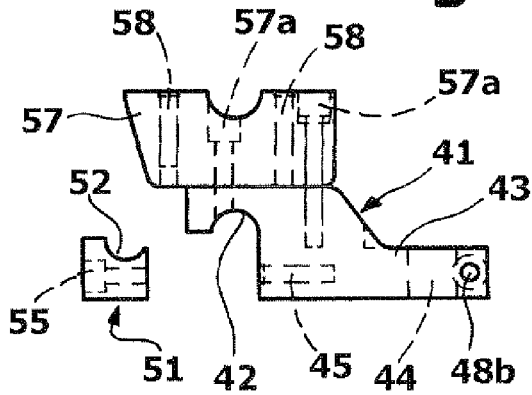
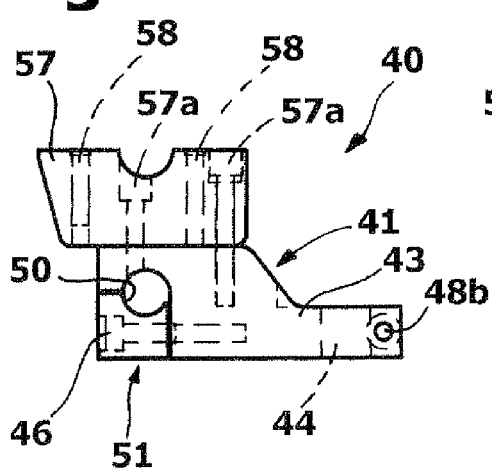
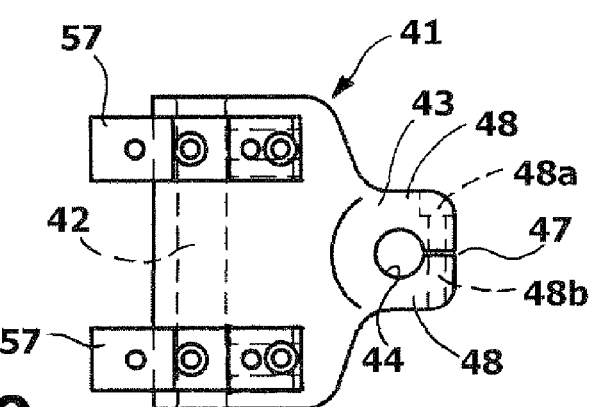

DEVICE FOR ADJUSTING INCLINATION OF A FRONT FORK OF A VEHICLE HAVING TWO OR THREE WHEELS, PARTICULARLY A CYCLE OR A MOTORCYCLE

FIELD OF THE INVENTION

The present invention relates to a device for adjusting the inclination of the steering front fork of a two- or a three-wheeled vehicle.

The typical function of devices of the described type is to enable changing the distance between the front and the rear axle of a motorcycle, in order to modify the vehicle's attitude and thus the driving characteristics thereof depending upon the requirements of use. These devices enable to adjust the distance between the front and the rear axle without necessarily the need of disassembling the motorcycle steering assembly and/or replacing one or more of the parts thereof.

PRIOR ART

Vehicles equipped with known adjustment devices have a steering assembly including a frame tube, within which a steering tube is mounted in a rotatable manner. The adjustment device, or the steering assembly incorporating it, comprises an upper plate support and a lower plate support, which rigidly connect both front rods of the fork bodies to the upper and lower ends of the steering tube, said ends being axially protruding out of the frame tube. In some known solutions the adjustment device is designed in a way enabling to vary in an adjustable manner the inclination of the frame tube relative to the vertical, while in other solutions the adjustment device is designed in a way that enables changing the inclination of the steering tube within the guide tube.

The adjustment devices according to prior art generally have a complex and expensive construction. Furthermore, the known devices require a specific pre-arrangement of the vehicle frame.

SUMMARY OF THE INVENTION

One aim of present invention is to obtain a device for adjusting the inclination of a steering front fork of a two- or three-wheeled vehicle having a simple and cheap structure, and also easy to use for the users. Another aim of present invention is to obtain one such device that can be easily applicable also on vehicles not initially provided with means to adjust the inclination of the front fork.

According to present invention, one or more of these aims are achieved by a device for adjusting the inclination of a steering front fork of a two- or three-wheel vehicle. The aims of present invention are also achieved by a steering assembly incorporating the above said adjustment device and by a two or three-wheeled vehicle incorporating such a device or assembly.

BRIEF DESCRIPTION OF THE DRAWINGS

Features and advantages of the invention will become apparent from the following description, made with reference to the annexed drawings, purely given as non limiting examples, wherein:

FIGS. 2 and 3 are schematic and partial views on a different scale, respectively a side view and a front view, of a steering assembly of a two-wheeled vehicle integrating an adjustment device according to the invention;

FIGS. 4-6 are schematic views (respectively a perspective view, a side view and a front view) of a first member of the device according to the invention;

FIGS. 15-17 are schematic views (respectively a perspective view, a side view and a front view) of two components of a fourth member of the device according to the invention;

FIG. 18 is a schematic side view of the two components of FIGS. 15-17 mutually assembled;

FIG. 19 is a schematic top view of one of the components of FIGS. 15-18.

DESCRIPTION OF PREFERRED EMBODIMENTS OF THE INVENTION

Figure 1:
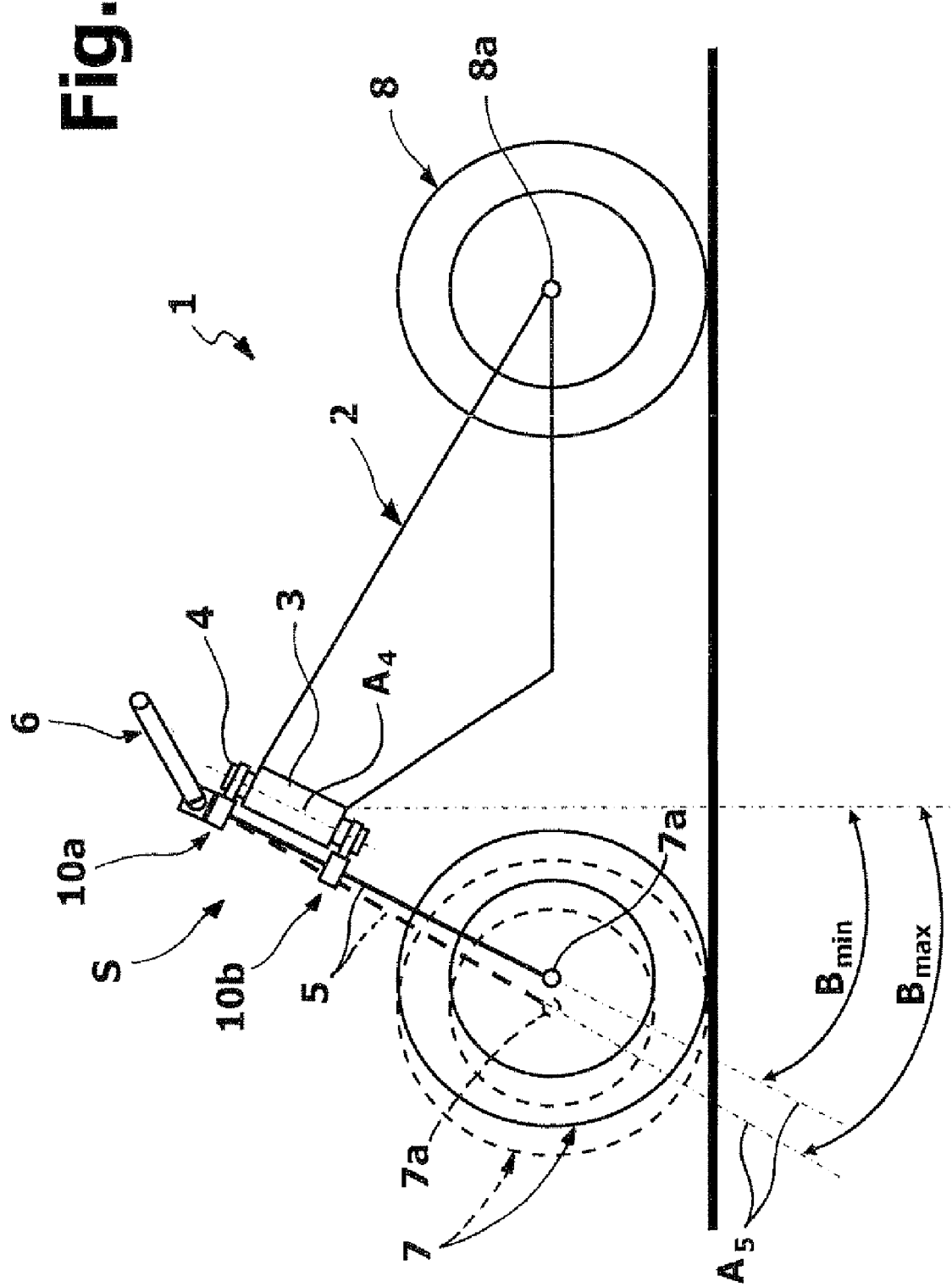
FIG. 1 schematically shows a two-wheeled vehicle equipped with an adjustment device according to the invention.

FIG. 1 schematically shows a two-wheeled vehicle, indicated with 1 as a whole, equipped with an adjustment device according to the invention. Hereinafter it is assumed that the vehicle 1 is a cross-country motorcycle, but it has to be considered that the invention can be used also on other types of motor-vehicles, and even on bicycles. Furthermore the invention can be used also on three-wheeled vehicles having a front steering fork.

Figure 2:
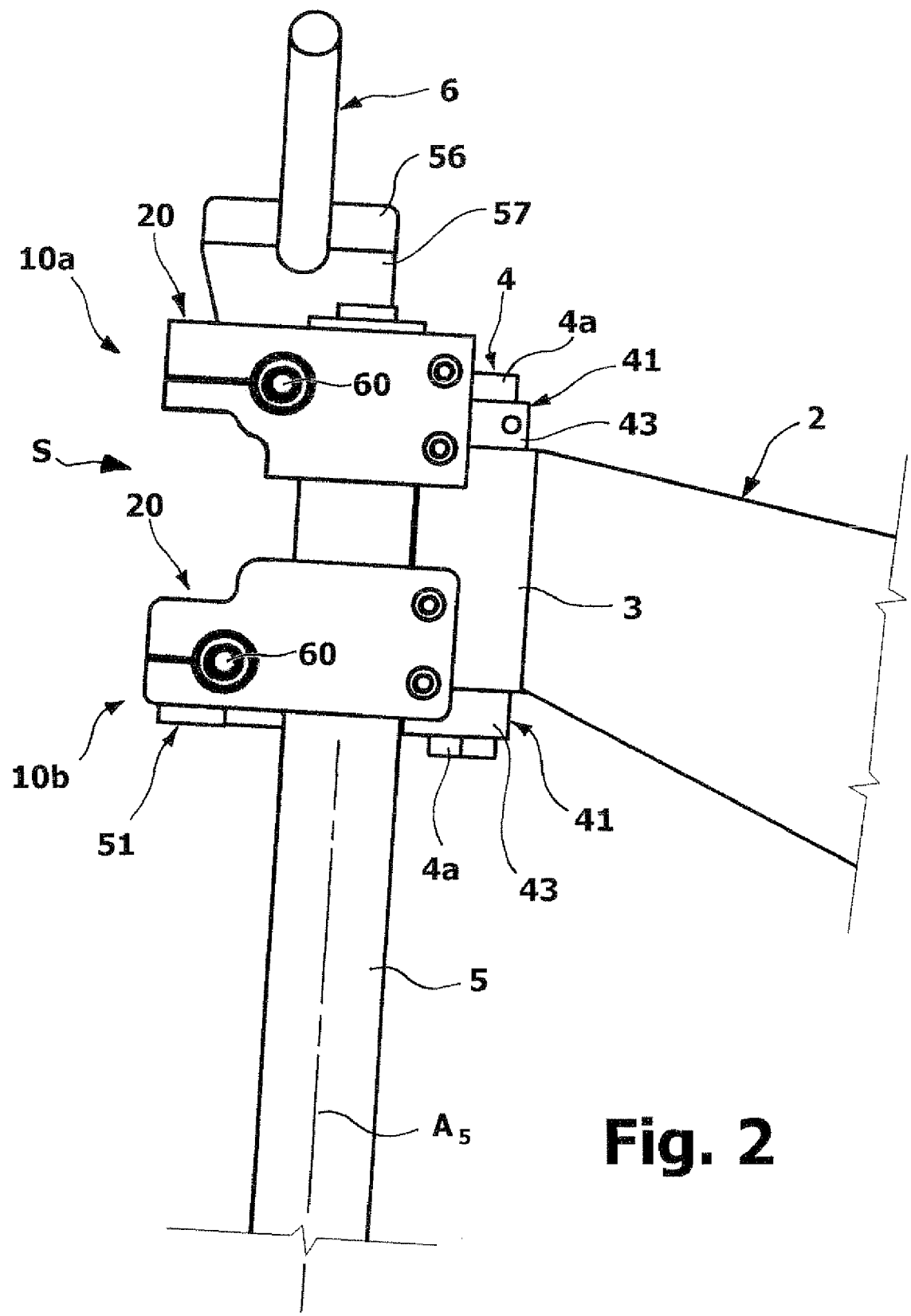

Referring also to FIGS. 2 and 3, vehicle 1 has a frame 2, having a known general structure, including a frame tube 3 which is part of a steering assembly, indicated with S as a whole. The steering assembly S further comprises a steering tube 4, rotatably mounted in the frame tube 3. The ends of the steering tube 4 axially protrude out of the frame tube 3 and on them nuts indicated with 4a in FIG. 2 are screwed, to axially constrain the tube 4 in the tube 3, according to known technique. Two substantially parallel fork rods, for example being part of a telescopic front suspension system as normally used on motorcycles, are indicated with 5 (see particularly FIG. 3).

The steering assembly S also comprises means for rigidly connecting the two fork rods to the steering tube 4. According to a feature of the invention, these means are part of a device for adjusting the inclination of the steering front fork of the vehicle 1 and comprise an upper connecting unit and a lower connecting unit, respectively indicated with 10a and 10b as a whole. Each connecting unit 10a and 10b of the device according to the invention consists of a plurality of components that are mechanically interconnected in an adjustable manner and replaces the traditional upper and lower plates used in the prior art to rigidly connect the fork rods to the steering tube, at different heights.

As explained later, the two units 10a and 10b are prearranged for allowing an adjustable variation of the inclination of the fork rods 5 relative to the steering tube 4, without the need of separating or disassembling the units, the fork rods and the steering tube. For this purpose, the axis of the steering tube 4 is indicated with $A_4$ in FIG. 1, while the axis of one of the fork rods is indicated with $A_5$, being represented, respectively in solid and dashed line, in two different adjustment conditions of the device according to the invention; $B_{min}$ and $B_{max}$ indicate the two angles of axis $A_5$ relative to the vertical and visually express the different inclination of the front fork, in the above said two adjustment conditions.

Reference 6 indicates a handlebar of the vehicle 1, which is preferably connected to the upper unit 10a as described later. Reference 7 and 8 in FIG. 1 designates the front and the rear wheels of the vehicle 1, with the respective hubs 7a and 8a; also the front wheel 7 is represented in two different adjustment conditions of the device according to the invention, respectively in solid and dashed line.

As particularly shown in FIGS. 2 and 3, each connecting unit 10a and 10b comprises:
one pair of side fastening members, hereinafter referred to as side supports, indicated with 20, each of them designed to be rigidly connected to a respective fork rod 5,
an intermediate fastening member, hereinafter referred to as intermediate support, indicated with 40, operatively interposed between the side supports 20 of the respective pair and designed to be rigidly connected to the steering tube 4.

Each of the intermediate supports 40 of the upper unit 10a and of the lower unit 10b is connected to a respective end region of the steering tube 4, preferably in the zone interposed between a nut 4a and the frame tube 3, as for example shown in FIG. 2. In FIGS. 2 and 3 it can be also seen how the side supports 20 of the upper unit 10a are rigidly connected to the fork rods 5 at a greater height with respect to the side supports 20 of the lower unit 10b.

In the preferred embodiment of the invention the means of the adjustment device which enable to adjust the inclination of the front fork comprise at least one eccentric or cam system associated to each connecting unit 10a and 10b. This eccentric system is designed to mechanically constrains each side support 20 to the respective intermediate support 40 and is operable for varying the position of the side supports relative to the intermediate support, in order to modify as a consequence the inclination of the fork rods 5 relative to the steering tube 4.

The eccentric system of each unit 10a and 10b comprises a respective connecting element, hereinafter referred to as cam pin, indicated with 60 and shown in different views in FIGS. 4-6 (scale of FIG. 5 is larger relative to FIGS. 4 and 6).

The cam pin 60 is preferably made of steel and is shaped to comprise more portion, among which there are at least:
two side portions 61, substantially shaped as shaft having a circular cross section, which are longitudinally extended according to one same axis $A_{61}$, and
one intermediate portion 62, being eccentric relative to the side portions 61.

In the exemplified embodiment also the intermediate portion 62 is shaped as a shaft with circular cross section, longitudinally extending according to a respective axis $A_{62}$, which is parallel to axis $A_{61}$ of the side portions; in any way, the intermediate portion of the cam pin can be differently shaped with respect to the shown example, but its functions must remain the same as described later.

Figure 6:
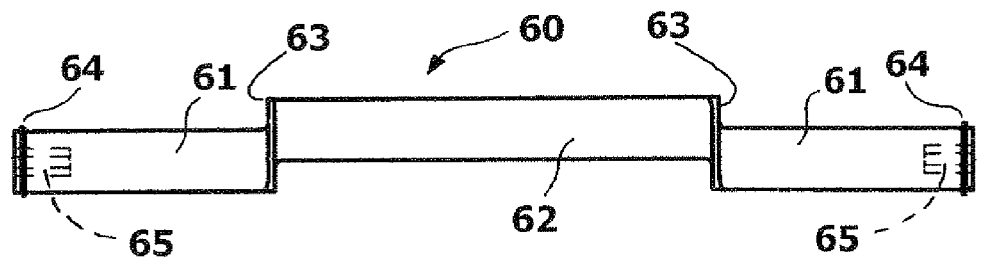

Again with reference to the presently preferred embodiment, and as clearly shown in FIGS. 4-6, the cam pin 60 includes two substantially disk-shaped parts 63, between the intermediate portion 62 and the side portions 61. The disk-shaped parts 63 has substantially the function to strengthen the structure of the pin 60 at the transition zones between portion 62 and portions 61; another function of the disk-shaped parts 63 is to guide the rotation of the pin 60 during the adjustment phase, and for this reason they are preferably disk-shaped. Each end of the intermediate portion 62 of pin 60 is rigidly connected or integral to a face of a respective disk shaped part 63, in an eccentric position; the other face of each disk shaped part 63 is instead rigidly connected or integral to the end of a respective side portion 61 in an eccentric position, such that axes $A_{61}$ and $A_{62}$ are reciprocally staggered and parallel to each other.

As explained later, in the shown exemplified embodiment, each side portion 61 of pin 60 is rigidly connected to the side support 20 of respective unit 10a or 10b, but can be released from it, while the intermediate sector 62 is connected to the intermediate support 40 of the same unit.

Figure 7:
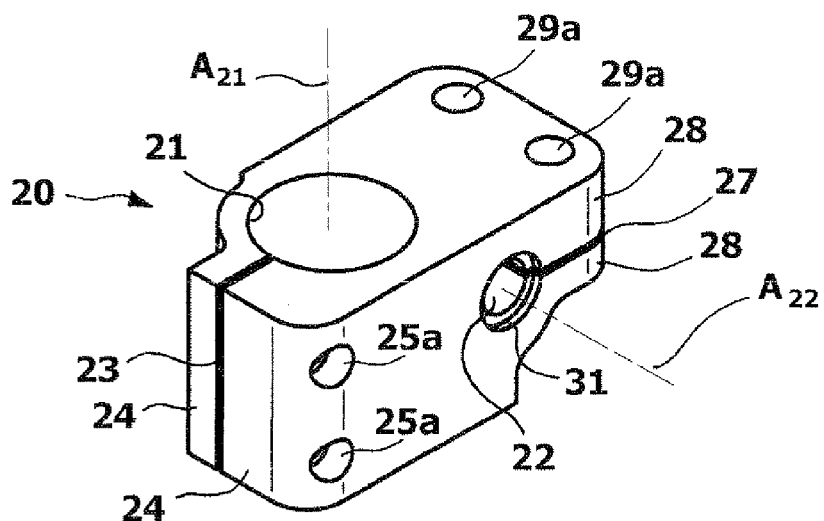
FIGS. 7-9 are schematic views (respectively a perspective view, a side view and a front view) of a second member of the device according to the invention.
Figure 8:
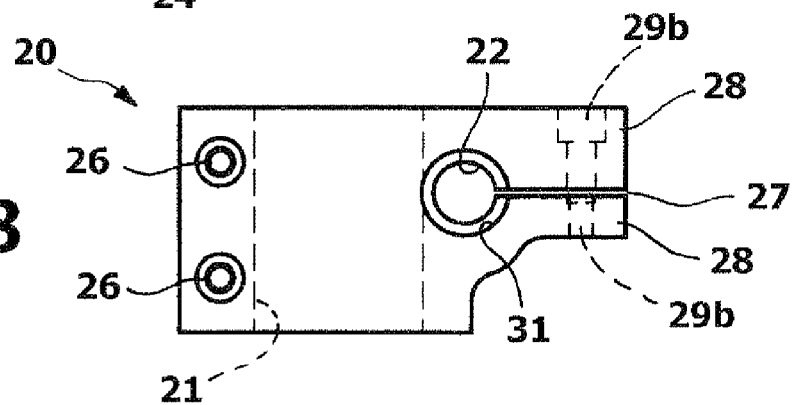
Figure 9:
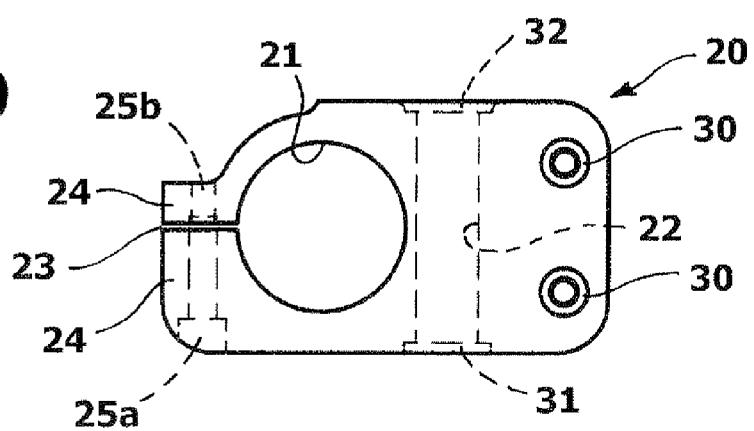
Figure 10:
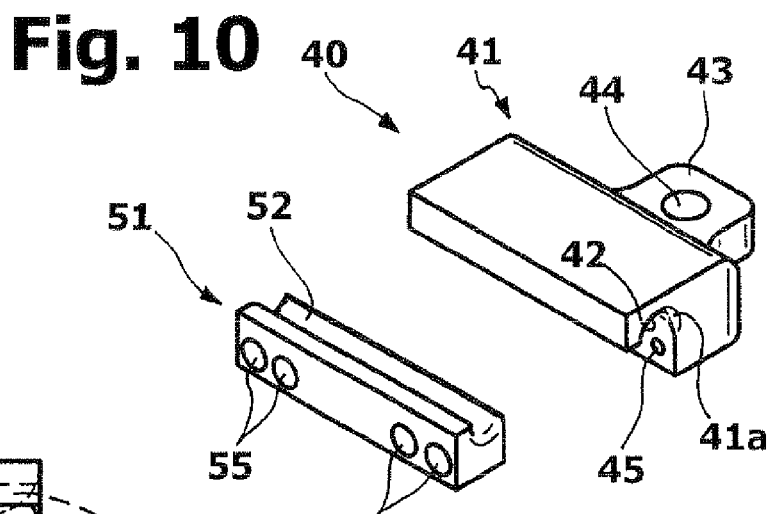
FIGS. 10-12 are schematic views (respectively a perspective view, a side view and a front view) of two components of a third member of the device according to the invention.
Figure 11:
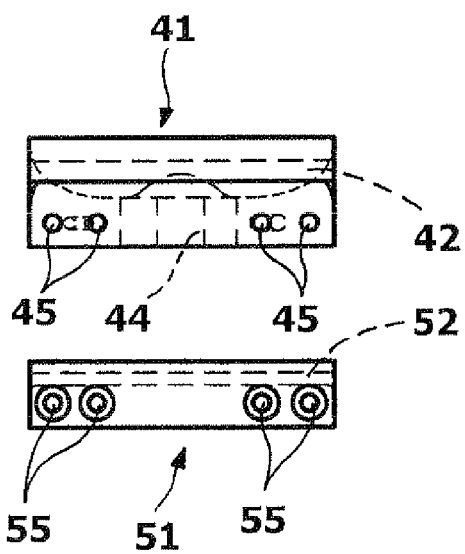
Figure 12:
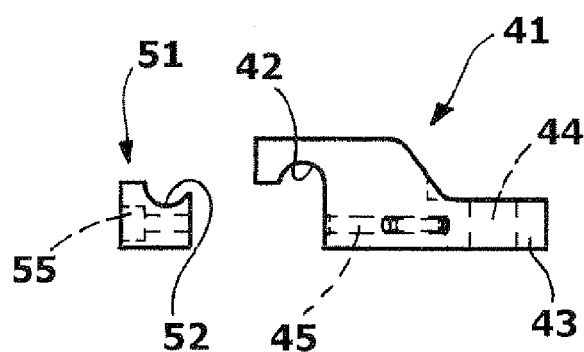
Figure 13:
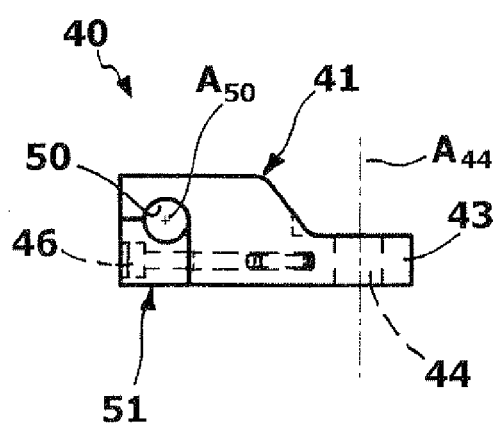
FIG. 13 is a schematic side view of the two components of FIGS. 10-12 mutually assembled.

FIGS. 7-9 show in different views one of the side supports 20 of the upper unit 10a, being evident that the shape of the other side support of the same unit has a substantially mirror-shape to the one being represented, an that the configuration of the side supports 20 of the lower unit 10b is substantially similar to that of the side supports of the upper unit 10a.

Support 20 has a body that is preferably made of metal or composite material, for example magnesium or a light metal alloy, such as ERGAL (aluminium alloy). In the body of support 20 a main through-passage 21 is provided, having a circular cross section and extending axially, designed for receiving one axial section of a respective fork rod (see FIGS. 2 and 3). In the body of support 20 a second axially extended passage is provided, indicated with 22, designed to receive one side portion 61 of the cam pin 60 (FIGS. 4-6), respectively of the upper or lower unit. As shown in FIG. 7, the axis $A_{21}$ of passage 21 is preferably—but not necessarily—perpendicular to the axis $A_{22}$ of the passage 22. In the given example also passage 22 is configured as a through-passage.

The body of side support 20 has a first cut 23, substantially parallel to axis $A_{21}$ in the shown example, which cut ends in the passage 21: in this way, in the body of support 20 two first clamp portions are defined, indicated with 24, to clamp within passage 21 the respective section of the fork rod 5. For this purpose, the clamp portions have holes or passages 25a, 25b, transverse to cut 23, for receiving suitable loosenable tightening members, only schematically shown in FIG. 8, where they are indicated with 26; these tightening members 26 can be conveniently embodied by screws, for example provided with hexagonal notch, in which case the holes 25a are shaped to house at least part of the screw head, whereas passages 25b are threaded. Obviously screws and threaded holes can be replaced by bolts and non-threaded holes.

The body of side support 20 has a second cut 27, substantially parallel to axis $A_{22}$ in the example, ending in passage 22. In this way, in the body of support 20 two second clamp portions are defined, indicated with 28, for clamping within passage 22 the respective side portion 61 of pin 60 of FIGS. 4-6. Also the clamp portions 28 have holes or passages 29a, 29b transverse to cut 27, for receiving loosenable tightening members, that are only schematically shown in FIG. 9, where they are indicated with 30. Using passage 22 and clamp portions 28 with the respective tightening members 30, the side support 20 can be rigidly connected—in a releasable way—to a respective side portion 61 of pin 60.

The diameter of passages 21 and 22 is such to allow, when screws 26 and 30 are loosened, an easy insertion of the rods 5 into passages 21 and of one side portion 61 of pin 60 into passage 22. Preferably, the diameter of hole 21 is, with the screws 26 and 30 being loosened, slightly greater then the diameter of the fork rods 5, in order to avoid possible damage of the rods' surface during the insertion of the supports 20; the diameter of holes 22 can also be substantially similar to the diameter of the side portions 61 of pin 60, such that it can receive them with a slight interference: by tightening screws 26 and 30 a rigid connection is then obtained, of supports 20 to rods 5 and pin 60, respectively.

It can be seen in FIGS. 7-9 that passage 22 has, at the axial ends thereof, respective widenings o seats indicated with 31 and 32, coaxial to ach other and to passage 22. Seat 31 is formed at the outer flank of support 20 (that is the flank opposite relative to the one facing the intermediate support 40 of the corresponding unit 10a or 10b). This seat 31 is designed for cooperating with an annular blocking member, preferably a seeger ring, mounted at the corresponding end of pin 60: one such ring is schematically shown in FIGS. 4 and 6, where is indicated with 64, inserted into a respective circular groove formed at the outer end of each portion 61 of pin 60. The function of rings 64 is to avoid axial movements of pin 60 within components 20, 40 of the upper or lower connecting unit, when the unit at issue is assembled and operative. Seat 32, formed at the inner flank of support 20 (that is the flank facing the intermediate support 40 of the corresponding unit 10a or 10b), substantially forms a cam seat belonging to the above said eccentric system, and is designed to accommodate a respective disk-shaped part 63 of the cam pin 60 (FIGS. 4-6), so as to enable and guide rotation thereof, as described later.

FIGS. 10-14 show in different views the intermediate support 40 of the lower connecting unit 10b.

The intermediate support 40 is formed by two parts, indicated with 41 and 51, and hereinafter referred to as rear component and front component, respectively. Components 41 and 51—preferably made of the same material as supports 20 (metal, composite, light alloy)—are configured to clamp therebetween the intermediate portion 62 of cam pin 60 of unit 10b. For this purpose, in each component 41 and 51 there is defined an axially extended portion of a receiving transverse seat: in FIGS. 10-12 the above said seat portions are indicated with 42 and 52 and are shaped as cavity having a substantially semicircular cross section, whereas the seat is indicated as a whole with 50 only in FIG. 13, with the corresponding axis $A_{50}$.

Component 41, which in the example has overall dimensions bigger than component 51, has a substantially cantilevered rear part 43, wherein a through-passage 44 is formed. Axis $A_{44}$ of this passage 44 (see FIG. 13) extends transversely, preferably perpendicularly, relative to axis $A_{50}$ of the receiving seat 50. Passage 44 is aimed at receiving a section of the lower region of the steering tube 4 that is between the lower end of the frame tube 3 and the lower nut 4a (see FIG. 2 for example).

Components 41 and 51 of the intermediate support 40 have respective receiving seats for loosenable tightening members, such as screws or bolts. In the example, to this purpose, component 51 has through-holes 55, while component 41 is frontally provided with threaded blind holes 45; socket head screws are only schematically shown in FIG. 13, where they are indicated with 46. As can be imagined, from FIG. 13, in the assembled condition of components 41 and 51, holes 45 and 55 are in axial alignment to receive screws 46; by tightening these screws, the intermediate portion 62 of cam pin 60 results in being rigidly clamped by the transverse seat 50; for this purpose, preferably, the diameter of the intermediate portion 62 of cam pin 60 is slightly bigger than the diameter of seat 50, as defined by seat portion 42 and 52 of components 41 and 51.

Figure 14:
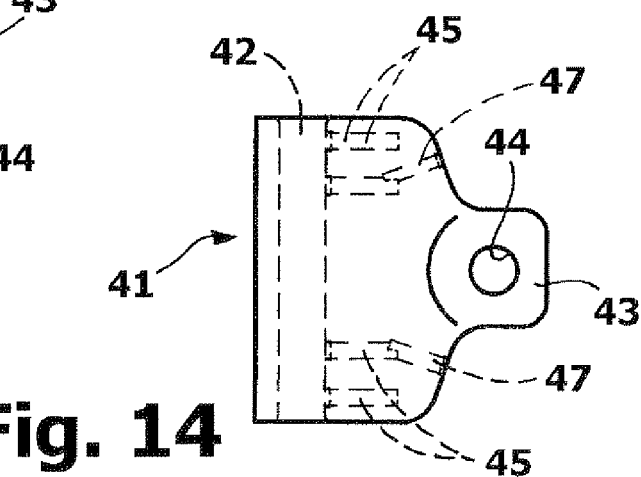
FIG. 14 is a schematic top view of one component of FIGS. 10-13.

As is visible in FIG. 14, component 41 can be advantageously provided with, in the rear part thereof, of oblique passages or seats 47, being preferably threaded, for mounting elements, not shown, aimed at delimiting the steering angle.

The intermediate support 40 of the upper connecting unit 10a is shown in different views in FIGS. 15-19 and has a general construction similar to the intermediate member 10.

In the exemplified embodiment, the intermediate support 40 of the upper unit 10a has fastening means to rigidly connect the central portion of handlebar 6. These fastening means comprise in particular an upper and a lower clamping elements, indicated with 56 and 57 in FIGS. 2 and 3. As can be seen for example in FIGS. 15-18, the lower clamping elements 57 have first through-holes 57a, for screws 57b (FIGS. 17 and 18) used to rigidly connect the same elements to the upper part of component 41; for this purpose threaded blind holes—not shown but clearly visible for example in FIGS. 17 and 18—are located on the upper part of component 40. The lower clamping elements 57 have further threaded holes 58, for tightening by means of screws—not shown—the upper clamping elements 56, such that a respective central portion of handlebar 6 is clamped between the clamping elements 56-57, as shown for example in FIG. 3.

FIG. 19 shows that the rear part 43 of the rear component 41 has a cut 47, ending in passage 44: in this way, two clamp portions 48 are defined in portion 43, for clamping within the passage 44 a section of the upper region of the steering tube 4 that is located between the upper end of the frame tube 3 and the upper nut 4a (see FIG. 2). The clamp portions 48 have at least one respective hole or passage 48a, 48b, for receiving a suitable loosenable tightening member, such as a screws having a head with hexagonal socket, not shown in figure.

The device according to the invention also comprises manoeuvring means, for allowing a user to carry out manually the adjustment of the inclination of the front fork, using a tool. In the shown example these manoeuvring means are provided for allowing to operate the above mentioned eccentric system, or to impart the cam pin 60 a rotation movement about axis $A_{61}$ (FIG. 4), of the respective side portions 61 which, in the assembled condition of the device, are housed within passages 22 of the side supports 20.

As shown in FIGS. 4-6, in the presently preferred embodiment, these manoeuvring means comprise a keyhole or seat 65, formed at the end face of at least one of the side portions 61 of cam pin 60 and configured for cooperating with a suitable tool. In the shown example, each seat 65 has hexagonal cross section and the tool used for carrying out a the adjustment is a normal Allen key, not shown. Not that, though preferable, it is not strictly necessary that both end faces of pin 60 have a seat 65, since a single seat 65 at one end is sufficient to impart the pin the required rotation during the adjustment.

The device according to the invention is also preferably provided with reference means, to give a visible indication of the adjustment position. In the shown example these means are configured for giving a visible indication of the angular position of cam pin 60 relative to the side supports 20, or of the amount of rotation imparted from time to time to the pin during the adjustment, and consist of a reference element, indicated with 66, for example a notch or incision, on at least one end face of cam pin 60, preferably a face provided with a seat 65.

The adjustment device according to the invention is easy to install. Suppose that the adjustment device has to be installed on a normal motorcycle not having means for adjusting the inclination of the front fork thereof. In a first step the front fork of the motorcycle has to be disassembled: the traditional upper and lower plates of the steering assembly are firstly uncoupled from the steering tube 3 and then extracted from the above the rods 5, and the handlebar is disassembled from the upper plate, all the above in a known manner.

Between the two side supports 20 of each unit 10a and 10b is pre-assembled the cam pin 60; for this purpose, both side portions 61 of pin 60 are inserted into the passages 22 of both supports 20, while the screws 30 are loosened, to ease the insertion; then the seeger rings 64 are mounted at the two ends of pin 60. Then the side supports 20 of the two units 10a and 10b are inserted onto the fork rods 5, the screws 26 being loosened to ease the slipping of rods within the passages 22 of supports 20. On the other hand, the rear components 41 of the intermediate supports 40 of the two units are loosely secured to the upper and lower end regions of the steering tube 4, that protrude out of the frame tube 3, using for this purpose the portions 43 having the passages 44 and the nuts 4a (FIG. 2).

The fork assembly is then approached to the front part of the motorcycle frame 2, for example such as to firstly positioning the intermediate portion 62 of cam pin 60 of the upper unit 10a at the seat portion 42 of component 41 of the intermediate support 40 of the same unit; thereafter component 51 of the intermediate support 40 of the same unit is mounted, by means of the screws 46. Similar operations are performed concerning the cam pin 60 and the intermediate support 40 of the lower connecting unit 10b. Then the front components 51 of the two intermediate supports 40 are tightened, using the screws 46, onto the respective rear components 41, so as to rigidly clamp between these components 41-51 the respective portions 62 of pins 60. Preferably pins 60 are rigidly clamped to the intermediate supports 40 in substantially similar angular positions within the respective seats 50. Thereafter:

- the side portions 61 of pins 60 are tightened within passages 22 of the side supports 20, by means of the clamp portions 28 and the screws 30,
- the side supports 20 are tightened onto the fork rods 5, by means of the passages 21, the clamp portions 24 and the screws 26, and
- the screw of the clamp portions 48 (FIG. 19) of the intermediate support 40 of the upper unit 10b is tightened, as well as the nuts 4a at both ends of the steering tube 4.

As a result, the unit consisting of units 10a, 10b with the rods 5 is rigidly connected to the steering tube 5. Obviously, in order to carry out this operations, the fitter has to visually check and—if necessary—to manually register the reciprocal positions of the various parts 4, 5, 20, 40, 60. Thereafter the handlebar 6 is rigidly connected to the upper unit 10a, specifically to the intermediate support 40 thereof, using the clamping elements 56 and 57.

The assembled device according to the invention thus becomes an integral and substantial part of the steering assembly S of the motorcycle 1, which can be used in a customary way. As previously stated, the two units 10a and 10b replace the upper and lower plates of a steering assembly according to the prior art.

Also the operations required for adjusting the inclination of the front fork of the motorcycle 1 are very simple. For this purpose the user must firstly loosen the screws 30 of the side supports 20 and the screws 46 of the intermediate supports 40, for both units 10a and 10b, in a way enabling the rotation of the cam pin 60 in the direction desired for each of them. The two pins 60 can be rotated substantially simultaneously, for example in opposite directions, using two Allen keys, or the two pins 60 can be rotated in sequence, or also only one of the two pins 60 can be rotated, the above depending upon the type and amount of the desired adjustment of inclination for the front fork. As can be imagined, in fact, due to the eccentric systems of the two units 10a, 10b, the rotation around axis $A_{61}$ of each cam pin 60 (FIG. 4) causes a restrained displacement of the corresponding side supports 20 with respect to the intermediate support 40 of the relevant unit, which is fixed to the steering tube 4: thus, at each unit, the rods 5 are approached to a greater or a lesser extent relative to the steering tube 4. Consequently, by acting in this way on one or both pins 60, depending upon the adjustment needs, it is possible to change the inclination of the fork rods 5—which are rigidly fixed to the side supports 20—relative to the steering tube 4 and to the vertical, as evidenced in FIG. 1. Presence of the reference 66 enables the user to visually locate the different adjustment positions, and for this purpose a fixed reference element or sign can be conveniently provided for also on the outer flank of at least one of the side supports 20; due to the presence of reference 66 the user can recognize preferred adjustment positions depending on use requirements of the motorcycle (for example, a first adjustment position for use of the motorcycle on highway, another adjustment position for use of the motorcycle in towns or on roads with many curves, another adjustment position for off-road use of the motorcycle, and so on). Note that variation of the inclination of the front fork allowed by the device according to the invention has also the effect of varying the height of the front part of the vehicle, thus also varying the position of the barycentre thereof. Once pin or pins 60 are have been brought in the desired angular position, the user has only to newly tighten screws 30 and 46 of the supports 20 and 40, respectively, so as to rigidly connecting again the different parts 20, 40, 60 to each other.

As can be seen, by means of the device according to the invention the adjustment of the inclination of the front fork can be done manually in a simple and quick manner, by a single operator and without the need of disassembling the adjustment device or replacing parts of the steering assembly of the vehicle. The components of the device according to the invention are also simple and cheap to manufacture, and have overall dimensions and weight comparable—or even reduced—with respect to the traditional upper and lower fork plates. Another clear advantage is that the device according to the invention can be easily mounted also on cycles and motorcycles not initially having means for regulating the inclination of the front fork.

Obviously, the constructive details and the embodiments can largely change with respect to those described and shown herein, without departing from the scope of present invention as defined by the claims that follow. Also the materials used to manufacture the components of the units 10a, 10b can be changed with respect to those given as examples and the various particulars of the units can be worked by metal machining and/or casting.

The cam seats designed to receive the disk shaped parts 63 could be each defined in a respective flank of the intermediate support 40, and therefore with the two components 41, 51 of the intermediate support that each define a portion of each cam seat. Such case has been schematically shown in FIGS. 10 and 15, wherein the cited portions of one of the cam seats are indicated with 41a and 51a, respectively for components 41 and 51.

The invention claimed is:

1. Device for adjusting inclination of a front fork (5) of a two- or three-wheeled vehicle having a steering assembly (S) comprising:
    a frame tube (3) being part of a frame (2) of the vehicle (1); and
    a steering tube (4) being rotatable within the frame tube (3);
    the device for adjusting comprising means for rigidly connecting the steering tube (4) to two fork rods (5) that are substantially parallel to each other;
    wherein said means for connecting comprise an upper connecting unit (10a) and a lower connecting unit (10b) prearranged for enabling to vary in an adjustable manner inclination of the fork rods (5) with respect to the steering tube (4), each connecting unit (10a, 10b) consisting of a plurality of separate components that are mechanically interconnected in an adjustable manner,
wherein the plurality of separate components of each connecting unit (10a, 10b) comprises:
one pair of side fastening members (20), each side member being rigidly connectable to a respective fork rod (5), and
an intermediate fastening member (40), operatively interposed between the side members (20) and rigidly connectable to the steering tube (4);
wherein the intermediate members (40) of the upper unit (10a) and of the lower unit (10b) are rigidly connectable to an upper end region and to a lower end region of the steering tube (4), respectively, and the side members (20) of the upper unit (10a) are rigidly connectable to the fork rods (5) at an upper height with respect to the side members (20) of the lower unit (10b); and
wherein each side member (20) is mechanically constrained in an adjustable manner to the respective intermediate member (40), for enabling position adjustment of the side members (20) relative to the intermediate member (40) to cause variation of inclination of the fork rods (5) relative to the steering tube (4).

2. Device for adjusting inclination of a front fork (5) of a two- or three-wheeled vehicle having a steering assembly (S) comprising:
a frame tube (3) being part of a frame (2) of the vehicle (1); and
a steering tube (4) being rotatable within the frame tube (3);
the device for adjusting comprising means for rigidly connecting the steering tube (4) to two fork rods (5) that are substantially parallel to each other;
wherein said means for connecting comprise an upper connecting unit (10a) and a lower connecting unit (10b) prearranged for enabling to vary in an adjustable manner inclination of the fork rods (5) with respect to the steering tube (4);
wherein each connecting unit (10a, 10b) comprises:
one pair of side fastening members (20), each side member being rigidly connectable to a respective fork rod (5), and
an intermediate fastening member (40), operatively interposed between the side members (20) and rigidly connectable to the steering tube (4);
wherein each side member (20) is mechanically constrained in an adjustable manner to the respective intermediate member (40), for enabling position adjustment of the side members (20) relative to the intermediate member (40) and thus changing inclination of the fork rods (5) relative to the steering tube (4);
wherein the intermediate members (40) of the upper unit (10a) and of the lower unit (10b) are rigidly connectable to an upper end region and to a lower end region of the steering tube (4), respectively;
wherein the side members (20) of the upper unit (10a) are rigidly connectable to the fork rods (5) at an upper height with respect to the side members (20) of the lower unit (10b);
wherein each connecting unit (10a, 10b) comprises at least one eccentric system (32, 60; 41a, 51a, 60);
wherein the eccentric system (32, 60; 41a, 51a, 60) comprises a connecting body (60) having two side parts (61), longitudinally extending according to one same axis ($A_{61}$), and an intermediate eccentric part (62); and
wherein each side part (61) is rigidly connectable, in a loosenable manner, to a respective side member (20) and the intermediate part (62) is rigidly connectable, in a loosenable manner, to a respective intermediate member (40).

3. Device according to claim 1, wherein each connecting unit (10a, 10b) comprises at least one eccentric system (32, 60; 41a, 51a, 60), the eccentric system (32, 60; 41a, 51a, 60) comprising a connecting body (60) operable for changing the position of the side members (20) relative to the respective intermediate member (40).

4. Device according to claim 1,
wherein each connecting unit (10a, 10b) comprises at least one eccentric system (32, 60; 41a, 51a, 60), the eccentric system (32, 60; 41a, 51a, 60) comprising a connecting body (60) that extends longitudinally in a transverse direction relative to the fork rods (5); and
wherein each side member (20) is mechanically constrained to the respective intermediate member (40) by means of said eccentric system (32, 60; 41a, 51a, 60), the connecting body (60) of the eccentric system being operable for changing the position of the side members (20) relative to the intermediate member (40).

5. Device according to claim 3,
wherein the connecting body (60) has two side parts (61), longitudinally extending according to one same axis ($A_{61}$), and an intermediate eccentric part (62); and
wherein each side part (61) is rigidly connectable, in a loosenable manner, to a respective side member (20) and the intermediate part (62) is rigidly connectable, in a loosenable manner, to a respective intermediate member (40).

6. Device according to claim 5, wherein the connecting body (60) has, in each transition region between said intermediate part (62) and one said side parts (61), a substantially disk-shaped part (63).

7. Device according to claim 3, wherein said eccentric system (32, 60; 41a, 51a, 60) comprises at least one cam seat (32; 41a, 51a).

8. Device according to claim 5,
wherein the connecting body (60) has, in each transition region between said intermediate part (62) and one said side parts (61), a substantially disk-shaped part (63); and
wherein said eccentric system (32, 60; 41a, 51a, 60) comprises two cam seats (32), each cam seat being provided for housing a respective one said disk-shaped part (63), both cam seats (32) being at least partially formed in one said intermediate member (40) or each cam seat (32) being at least partially formed in a respective side member (20) of one said pair.

9. Device according to claim 5, wherein each side member (20) of one said pair has a body wherein there are formed:
a first axially extended through passage (21), designed for receiving an axial portion of a respective fork rod (5),
a second axially extended passage (22), designed for receiving one said side part (61) of the respective connecting body (60),
the axis ($A_{21}$) of said first passage (21) being transverse to the axis ($A_{22}$) of said second passage (22), at least one said second passage (22) being configured as a through passage.

10. Device according to claim 5, wherein the intermediate member (40) comprises a first and a second body part (41, 51) prearranged to clamp therebetween said intermediate part (62) of the respective connecting body (60), in each said body part (41, 51) of the intermediate member (40) there being defined a respective portion (42, 52) of a receiving seat (50) for said intermediate part (62) of the connecting body (60).

11. Device according to claim 10, wherein in one of said first and second body part (41, 51) a through passage (44) is formed, for the connection to a respective end region of the steering tube (4), the axis ($A_{44}$) of said passage (44) being transverse to the axis ($A_{50}$) of said receiving seat (50).

12. Device according to claim 9,
wherein the connecting body (60) has, in each transition region between said intermediate part (62) and one said side parts (61), a substantially disk-shaped part (63);
wherein said eccentric system (32, 60; 41a, 51a, 60) comprises two cam seats (32), each cam seat being provided for housing a respective one said disk-shaped part (63), both cam seats (32) being at least partially formed in one said intermediate member (40) or each cam seat (32) being at least partially formed in a respective side member (20) of one said pair;
wherein each cam seat (32) is coaxial to one said second passage (22) and is at least partially formed in a flank of the corresponding side member (20) that faces the intermediate member (40) or each cam seat (41a, 51a) is coaxial to said receiving seat (50) and is defined in a respective flank of the intermediate member (40) that faces a side member (40), the first and the second body part (41, 51) of the intermediate member (40) each defining a portion (41a, 51a) of each cam seat.

13. Device according to claim 10,
wherein the connecting body (60) has, in each transition region between said intermediate part (62) and one of said side parts (61), a substantially disk-shaped part (63);
wherein said eccentric system (32, 60; 41a, 51a, 60) comprises two cam seats (32), each cam seat being provided for housing a respective one said disk-shaped part (63), both cam seats (32) being at least partially formed in one said intermediate member (40) or each cam seat (32) being at least partially formed in a respective side member (20) of one said pair;
wherein each cam seat (32) is coaxial to one said second passage (22) and is at least partially formed in a flank of the corresponding side member (20) that faces the intermediate member (40) or each cam seat (41a, 51a) is coaxial to said receiving seat (50) and is defined in a respective flank of the intermediate member (40) that faces a side member (40), the first and the second body part (41, 51) of the intermediate member (40) each defining a portion (41a, 51a) of each cam seat.

14. Device according to claim 5, comprising manoeuvring means (65) for imparting the connecting body (60) a rotation movement about said one same axis ($A_{61}$) of the corresponding side parts (61).

15. Device according to claim 3, comprising reference means (66) for supplying a visible indication of an angular adjustment position of the connecting body (60).

16. Device according to claim 9, wherein the body of each side member (20) has at least one cut (23) ending in said second passage (22) so as to define in the same body two clamp portions (28) for clamping within said second passage (22) the respective side part (61) of the connecting body (60), the first clamp portions (28) having respective receiving passages (29a, 29b) for loosenable tightening members (30).

17. Device according to claim 10, wherein the first and the second body part (41, 51) of the intermediate member (40) have respective receiving passages (45, 55) for loosenable tightening members (46).

18. Device according to claim 1, wherein clamping elements (56, 57) are associated to the intermediate member (40) of the upper unit (10a), to which clamping elements is rigidly connectable a generally central portion of a handlebar (6).

19. A two- or three-wheeled vehicle, comprising a device for adjusting inclination of a front fork (5) according to claim 1.

* * * * *